June 2, 1931.   E. D. EBY   1,808,533
CABLE TYPE CONDENSER
Filed Jan. 18, 1930
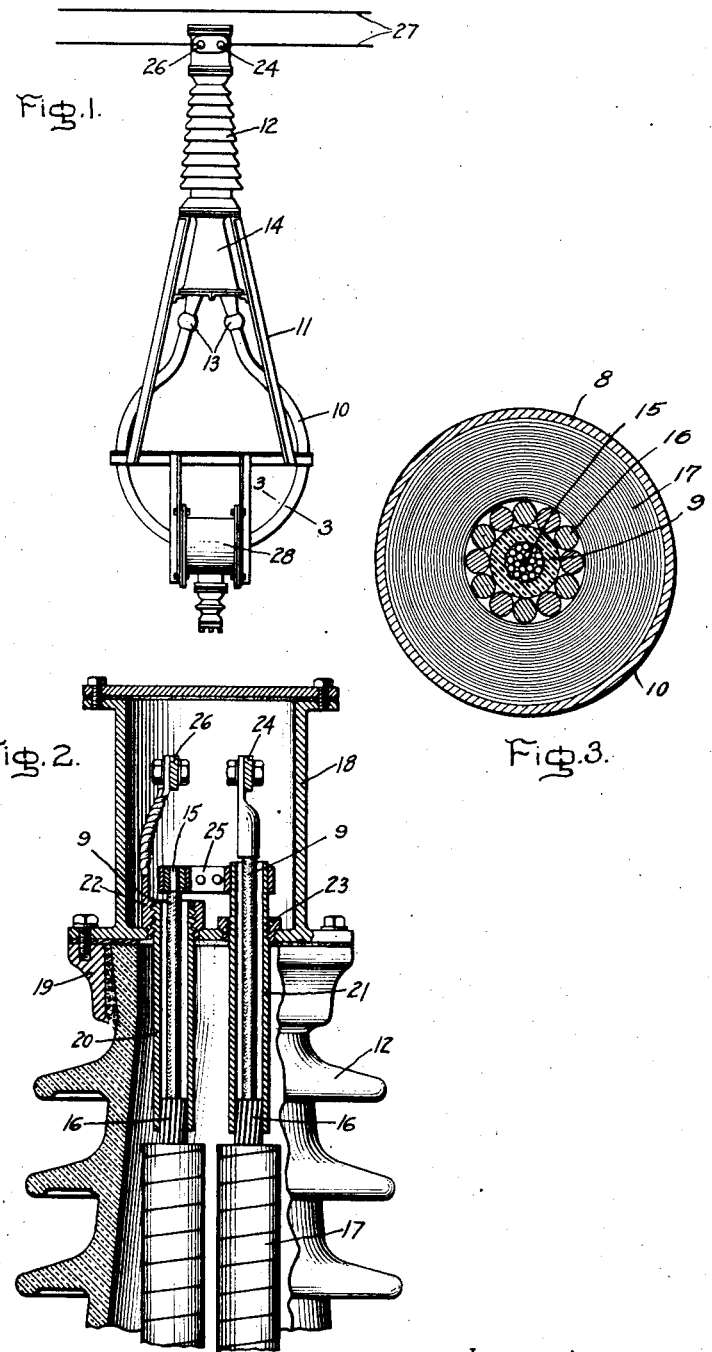
Inventor:
Eugene D. Eby.
by Charles V. Mulla
His Attorney.

Patented June 2, 1931

1,808,533

UNITED STATES PATENT OFFICE

EUGENE D. EBY, OF PITTSFIELD, MASSACHUSETTS, ASSIGNOR TO GENERAL ELECTRIC COMPANY, A CORPORATION OF NEW YORK

CABLE TYPE CONDENSER

Application filed January 18, 1930. Serial No. 421,830.

My invention relates to condensers or capacitors of the cable type such as that disclosed in my United States Patent No. 1,731,890, issued October 15, 1929. This type of condenser utilizes a metal sheathed cable, the inner conductor and the metal sheath of the cable forming the conductive elements of the condenser and being insulated from each other by the cable insulation which forms the condenser dielectric. In the condenser disclosed in the patent referred to above, the cable is in the form of a loop, the two ends of the inner conductor of the cable being brought together within an insulating bushing and being connected to a common terminal. If this terminal is connected to a source of electrical energy such as a conductor of a power transmission circuit, the inner conductor of the cable is maintained at the potential of the source and a current may be taken from the cable sheath through the capacity between the sheath and the inner conductor of the cable. The main current flowing in the transmission line or other source to which the condenser is connected does not, however, flow through the cable so that it is not possible to use the cable in combination with a current transformer. The general object of the present invention is to provide an improved cable type condenser of such construction and arrangement as to permit it to be used effectively in combination with a current transformer.

Other objects and advantages will appear from the following description taken in connection with the accompanying drawings in which Fig. 1 is a view in elevation of a combined cable type condenser and current transformer constructed in accordance with the invention, Fig. 2 is a sectional view of the upper end portion of the condenser, and Fig. 3 is an enlarged sectional view on the line 3—3 of Fig. 1.

Like references indicate similar parts in both figures of the drawings.

The particular form of the invention shown in the drawings includes a metal sheathed cable 10 formed into a depending loop and supported and held in shape by a frame 11 which is secured to the lower end of a hollow bushing 12. Both ends of the outer metal sheath 8 of the cable 10 are connected by sealed joints 13 to the bottom of a casing 14 depending from the lower end of the bushing 12. The cable 10 is shown as having two conductors 15 and 16 inside the sheath, the two conductors being separated from each other and from the sheath by insulation 9. It will be apparent, however, that a different number of conductors may be used if desired. The conductor 16 is formed of a plurality of strands concentrically surrounding the insulated central conductor 15 and separated from the outer sheath by insulation 17.

A hollow metal cap 18 is secured to the top of the bushing 12 by screwing it to a metal ring 19 cemented around the upper edge of the bushing, a gasket being interposed between the cup and ring to prevent leakage of insulating oil which preferably fills the bushing and cap and extends down into any spaces in the casing 14 and the cable 10.

The metal sheath 8 is removed from the cable 10 above the seals 13 but both ends of both of the conductors 15 and 16 extend up through the bushing 12 as indicated in Fig. 2, the ends of the central conductor 15 extending through the base of the cap 18. The ends of the conductor 16 are connected electrically and mechanically, as by soldering, to the lower ends of two metal tubes 20 and 21 which surround the ends of the central conductor 15 and extend through the base of the cap 18. The upper ends of the tubes 20 and 21 are provided with threaded nuts 22 and 23 respectively which have shoulders resting on the base of the cap 18 and thus help to support the cable 10. The nut 23 on the tube 21 is of insulating material to insulate the tube 21 from the cap 18 and the other tube 20. The end of the central conductor 15 which is surrounded by the tube 21 is connected to a terminal 24 extending through the wall of the cap 18. The tube 21 is connected by a connector 25 to the end of the central conductor 15 which is surrounded by the tube 20. The tube 20 is connected through the nut 22 to a second terminal 26 extending through the wall of the cap 18. Thus the two conductors 15 and 16 form two loops within the sheath of the cable 10 and are connected in series between the terminals 24 and 26. The outer metal sheath 8 is insulated from the conductors 15 and 16 by the insulation 17 and these parts therefore constitute the elements of a condenser.

The condenser is adapted to be connected through its terminals 24 and 26 in series with one side of an electrical circuit 27 such as a power transmission line as shown in Fig. 1. When so connected, the conductors 15 and 16 of the cable 10 will be maintained at the potential of the circuit 27 and current may be taken from the sheath 8 of the cable through the capacity between the sheath and the cable conductor 16. It is also obvious that the main current in the circuit 27 will flow through the conductors 15 and 16 in series which may therefore serve as the primary turns of a current transformer 28 surrounding the cable 10 as shown in Fig. 1. It is well known that a current transformer having a single turn primary does not usually have very great accuracy and that its accuracy may be improved by increasing the number of its primary turns. The construction which has been described has the advantage of providing two primary turns for the transformer 28 and it will be apparent that a greater number of primary turns may be provided if desired by using a cable having an appropriate number of conductors.

The invention has been explained by describing and illustrating a particular embodiment thereof but it will be apparent that changes may be made without departing from the spirit of the invention or the scope of the appended claims.

What I claim as new and desire to secure by Letters Patent of the United States is:

1. A combined condenser and current transformer including an insulating bushing, a cable having a conductor and a metal sheath surrounding and insulated from the conductor, said cable being in the form of a loop with its two ends extending into said bushing, the two ends of said sheath being sealed to one end of said bushing, a pair of terminals near the other end of said bushing, said cable conductor being connected between said terminals, and a current transformer surrounding the looped part of said cable.

2. A combined condenser and current transformer including an insulating bushing, a cable having a plurality of conductors and a metal sheath surrounding and insulated from said conductors, said cable being in the form of a loop with its two ends extending into said bushing, the two ends of said sheath being sealed to one end of said bushing, a pair of terminals near the other end of said bushing, said cable conductors being connected in series between said terminals, and a current transformer surrounding the looped part of said cable.

3. A condenser including an insulating bushing, a cable having a conductor and a metal sheath surrounding and insulated from the conductor, said cable being in the form of a loop with its two ends extending into said bushing, the two ends of said sheath being sealed to one end of said bushing, and a pair of terminals near the other end of said bushing, and said cable conductor being connected between said terminals, whereby said cable conductor may be connected in series with an electrical circuit to serve as the primary circut for a current transformer surrounding the looped part of said cable.

4. A condenser including an insulating bushing, a cable having a plurality of conductors and a metal sheath surrounding and insulated from said conductors, said cable being in the form of a loop with its two ends extending into said bushing, the two ends of said sheath being sealed to one end of said bushing, and a pair of terminals near the other end of said bushing, and said cable conductors being connected in series between said terminals.

In witness whereof, I have hereunto set my hand this 13th day of January, 1930.

EUGENE D. EBY.